(12) United States Patent
Sheller et al.

(10) Patent No.: US 11,526,745 B2
(45) Date of Patent: Dec. 13, 2022

(54) METHODS AND APPARATUS FOR FEDERATED TRAINING OF A NEURAL NETWORK USING TRUSTED EDGE DEVICES

(71) Applicant: Intel Corporation, Santa Clara, CA (US)

(72) Inventors: Micah Sheller, Hillsboro, OR (US); Cory Cornelius, Portland, OR (US); Jason Martin, Beaverton, OR (US); Yonghong Huang, Portland, OR (US); Shih-Han Wang, Taipei (TW)

(73) Assignee: Intel Corporation, Santa Clara, CA (US)

( * ) Notice: Subject to any disclaimer, the term of this patent is extended or adjusted under 35 U.S.C. 154(b) by 1346 days.

(21) Appl. No.: 15/892,138

(22) Filed: Feb. 8, 2018

(65) Prior Publication Data
US 2019/0042937 A1 Feb. 7, 2019

(51) Int. Cl.
*G06F 21/55* (2013.01)
*G06N 3/08* (2006.01)
*G06N 3/063* (2006.01)

(52) U.S. Cl.
CPC ............ *G06N 3/08* (2013.01); *G06F 21/554* (2013.01); *G06N 3/063* (2013.01); *G06F 2221/034* (2013.01)

(58) Field of Classification Search
CPC .................................................. G06F 21/554
USPC ......................................................... 706/25
See application file for complete search history.

(56) References Cited

U.S. PATENT DOCUMENTS

| | | |
|---|---|---|
| 2014/0181925 A1 | 6/2014 | Smith et al. |
| 2014/0189356 A1 | 7/2014 | Phegade et al. |
| 2014/0282868 A1 | 9/2014 | Sheller et al. |
| 2014/0282893 A1 | 9/2014 | Sheller et al. |
| 2014/0282945 A1 | 9/2014 | Smith et al. |
| 2014/0366111 A1 | 12/2014 | Sheller et al. |
| 2015/0143118 A1 | 5/2015 | Sheller et al. |
| 2015/0222633 A1 | 8/2015 | Smith et al. |
| 2015/0235024 A1 | 8/2015 | Corrion et al. |
| 2015/0281279 A1 | 10/2015 | Smith et al. |
| 2015/0304736 A1 | 10/2015 | Lal et al. |
| 2015/0341332 A1 | 11/2015 | Smith et al. |
| 2015/0363582 A1 | 12/2015 | Sheller et al. |
| 2015/0373007 A1 | 12/2015 | Sheller et al. |
| 2016/0006732 A1 | 1/2016 | Smith et al. |
| 2016/0174031 A1 | 6/2016 | Smith et al. |
| 2016/0180068 A1 | 6/2016 | Das et al. |
| 2016/0180078 A1 | 6/2016 | Chhabra et al. |
| 2016/0180093 A1 | 6/2016 | Goss et al. |
| 2016/0182502 A1 | 6/2016 | Smith et al. |
| 2016/0188350 A1 | 6/2016 | Shah et al. |
| 2016/0188848 A1 | 6/2016 | Smith et al. |

(Continued)

*Primary Examiner* — Anthony D Brown
(74) *Attorney, Agent, or Firm* — Hanley, Flight & Zimmerman, LLC

(57) ABSTRACT

Methods, apparatus, systems and articles of manufacture for federated training of a neural network using trusted edge devices are disclosed. An example system includes an aggregator device to aggregate model updates provided by one or more edge devices. The one or more edge devices to implement respective neural networks, and provide the model updates to the aggregator device. At least one of the edge devices to implement the neural network within a trusted execution environment.

23 Claims, 10 Drawing Sheets

(56) References Cited

U.S. PATENT DOCUMENTS

| | | |
|---|---|---|
| 2016/0188853 A1 | 6/2016 | Smith et al. |
| 2016/0283411 A1 | 9/2016 | Sheller et al. |
| 2017/0085565 A1 | 3/2017 | Sheller et al. |
| 2017/0142089 A1 | 5/2017 | Sheller et al. |
| 2017/0147822 A1 | 5/2017 | Goss et al. |
| 2017/0154179 A1 | 6/2017 | Corrion et al. |
| 2017/0169231 A1 | 6/2017 | Chhabra et al. |
| 2017/0180363 A1 | 6/2017 | Smith et al. |
| 2017/0214526 A1 | 7/2017 | Smith et al. |
| 2017/0244684 A1 | 8/2017 | Smith et al. |
| 2017/0318016 A1 | 11/2017 | Smith et al. |
| 2017/0366353 A1* | 12/2017 | Struttmann ............ H04L 9/0618 |
| 2017/0374509 A1 | 12/2017 | Smith et al. |

* cited by examiner

METHODS AND APPARATUS FOR FEDERATED TRAINING OF A NEURAL NETWORK USING TRUSTED EDGE DEVICES

FIELD OF THE DISCLOSURE

This disclosure relates generally to neural network training, and, more particularly, to methods and apparatus for federated training of a neural network using trusted edge devices.

BACKGROUND

Deep learning (DL) is an important enabling technology for the revolution currently underway in artificial intelligence, driving truly remarkable advances in fields such as object detection, image classification, speech recognition, natural language processing, and many more. In contrast with classical machine learning, which often involves a time-consuming and expensive step of manual extraction of features from data, deep learning leverages deep artificial neural networks (NNs), including convolutional neural networks (CNNs), to automate the discovery of relevant features in input data.

Training of a neural network is an expensive computational process. Such training often requires many iterations until an acceptable level of training error is reached. In some examples, millions of training iterations of might be needed to arrive at the global minimum error. Processed by a single entity, such iterations may take days, or even weeks, to complete. To address this, distributed training, where many different edge devices are involved in the training process is used to distribute the processing to multiple nodes.

BRIEF DESCRIPTION OF THE DRAWINGS

The figures are not to scale. In general, the same reference numbers will be used throughout the drawing(s) and accompanying written description to refer to the same or like parts.

DETAILED DESCRIPTION

Federated Learning enables a model representing a neural network to be trained using data across many edge systems without having to centralize the data used for such training. Edge devices perform local training, and provide training results to an aggregator device, which aggregates the training results among the multiple edge devices to update a centralized model, which can then be re-distributed to the edge devices for subsequent training and/or use. Such an approach facilitates many advantages such as, for example, bandwidth conservation (training data is already present at the edge device) and privacy (potentially private training data is not distributed outside of the edge that trained using that private training data).

However, because Federated Learning requires that the model be trained at the edge, various attack vectors to either discover or tamper with the model might be used. For example, an edge may lie about its training and submit training results that bias and/or disrupt the model (e.g., a malicious update attack). Malicious update attacks harmful to the model itself. Because existing aggregator devices cannot distinguish between legitimate and malicious updates, the aggregator may incorporate malicious results into the updated model. Some existing approaches attempt to mitigate these potential attacks by utilizing a Byzantine Gradient Descent when aggregating training results. The Byzantine Gradient Descent approach enables filtering of extreme edge results, provided the number of malicious updates is less than some predefined constant. The higher the constant, the greater the negative impact that the algorithm has on model convergence. If there are too many malicious updates, the aggregator cannot assure robustness.

An edge may attempt to discover the model parameters and/or structures, which may themselves be intellectual property (model stealing attacks). An edge may conduct an adaptive data extraction attack to attempt to reconstruct another edge's private data (e.g., a data extraction attack). An edge may lie about how much data the edge has used for training to attempt to gain larger influence over aggregated results (e.g., a data-size influence attack). An edge may conduct a Sybil attack in order to gain larger influence over aggregated results (e.g., a Sybil influence attack). An edge may poison their training data to introduce backdoors into the model (e.g., a data poisoning attack), and may even adapt the poisoned data over time to achieve limited forms of other attacks (e.g., an adaptive data poisoning attack).

Figure 1:
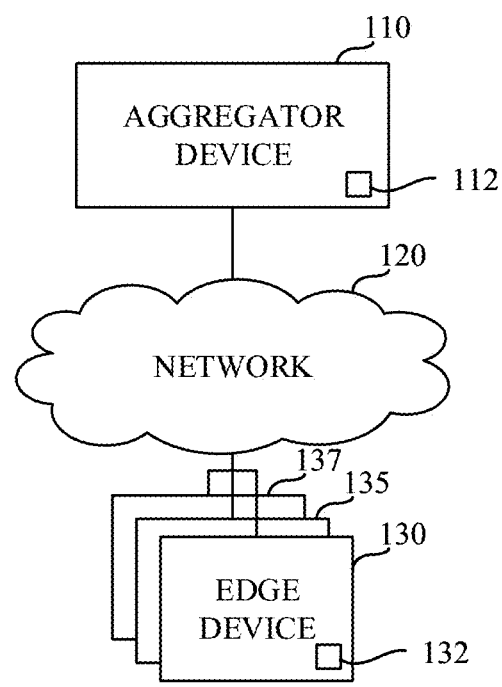
FIG. 1 is a block diagram of an example system constructed in accordance with the teachings of this disclosure to enable distributed training of a neural network.

FIG. 1 is a block diagram of an example system constructed in accordance with the teachings of this disclosure to enable distributed training of a neural network. The illustrated example of FIG. 1 includes an aggregator device 110, a network 120, and edge devices 130, 135, 137. Example approaches disclosed herein utilize a Trusted Execution Environment (TEE) implemented at either the edge device(s) 130, 135, 137 and/or the aggregator device 110. In the illustrated example of FIG. 1, the aggregator device 110 includes a TEE 112, and the example edge device 130 includes a TEE 132. In examples disclosed herein, a TEE is a secure area within a main processor of the device.

However, any other approach to implementing a TEE may additionally or alternatively be used such as, for example, a dedicated secure processor. The secure area implemented by the TEE guarantees that code and/or data loaded into the TEE is protected with respect to confidentiality and integrity. In some examples, the TEE is referred to as a secure enclave. The TEE functions as an isolated execution environment that provides security features such as, for example, isolated execution, integrity of Trusted Applications, and/or confidentiality. In some examples, the TEE provides hardware-based mechanisms to respond to remote attestation challenges that validate the integrity of the instructions executed within the TEE. In this manner, model training is conducted with integrity and the model parameters can be kept confidential.

While examples disclosed herein are described in the context of training and/or utilizing a neural network, any other machine-learning model trained using any approach such as, for example, gradient averaging, linear regression, logistic regression, support vector machines, etc.

While the illustrated example of FIG. 1 shows TEEs implemented at both the aggregator device 110 and the edge devices 130, 135, 137, the TEEs need only be implemented at one side of the system (e.g., at either the aggregator device 110 or the edge devices 130, 135, 137). Moreover, TEEs may be implemented only in some of the edge devices. When aggregating training results from the edge devices 130, 135, 137, the example aggregator device 110 may incorporate results differently depending on whether the results were provided by an edge device that implemented a TEE or not. For example, the example aggregator may apply Byzantine Gradient Descent (BGD) to training results provided by edge devices that do not implement a TEE to ensure that extreme edge training results are ignored. In some examples, a modified form of BGD may be used such that a final median is taken from a set of parameters whose majority is from trusted edges.

In examples disclosed herein, the aggregator device 110 is implemented by a server. However, any other type of computing platform may additionally or alternatively be used such as, for example a desktop computer, a laptop computer, etc. In examples disclosed herein, the TEE 112, implemented at the aggregator device 110 is implemented using Intel® Software Guard Extensions (SGX) technology to ensure that code executed and/or data stored at the aggregator device 110 is trusted and/or protected. However, any other type of trusted execution environment may additionally or alternatively be used. In examples disclosed herein, the example aggregator device 110 throttles the ability of edge devices to submit updates to the model, thereby limiting the ability of an attacker to maliciously affect the model. When implementing the TEE 112, the example aggregator 110 may be thought of as a trusted aggregator.

The network 120 of the illustrated example is a public network such as, for example, the Internet. However, any other network could be used. For example, some or all of the network 120 may be a company's intranet network (e.g., a private network), a user's home network, a public network (e.g., at a coffee shop). In examples disclosed herein, the network 120 transmits Ethernet communications. However, any other past, present, and/or future communication protocols may additionally or alternatively be used.

The example edge device(s) 130, 135, 137 of the illustrated example of FIG. 1 is implemented by a computing platform such as, for example an Internet of Things (IoT) device, a smartphone, a personal computer, etc. In examples disclosed herein, the example edge devices may be utilized by any type of entity such as, for example, a corporate institution, a bank, a government, an end user, etc. In some examples, a small number of edge devices are used (e.g., five devices). However, any number of edge devices may additionally or alternatively be used. For example, an edge device may be implemented as an IoT device, of which there may be thousands of devices, millions of devices, etc.

In examples disclosed herein, the TEE 132, implemented at the edge device 130 is implemented using Intel® SGX technology to ensure that code executed and/or data stored at the aggregator device 110 is trusted and/or protected. However, any other type of trusted execution environment may additionally or alternatively be used. When implementing the TEE 132, the example edge device 130 may be thought of as a trusted edge device.

In some examples, the TEE 132, implemented at the edge device 130, is used in combination with trusted input hardware of the edge device 130. Using trusted input hardware enables training to be performed with confidence that the training data has not been tampered with by a third party (e.g., an attacker attempting to modify training data).

In some other examples, the TEE 132, when implemented at the edge device, utilizes data update throttling to limit the ability of an attacker to perform training using un-trusted data.

Figure 2:
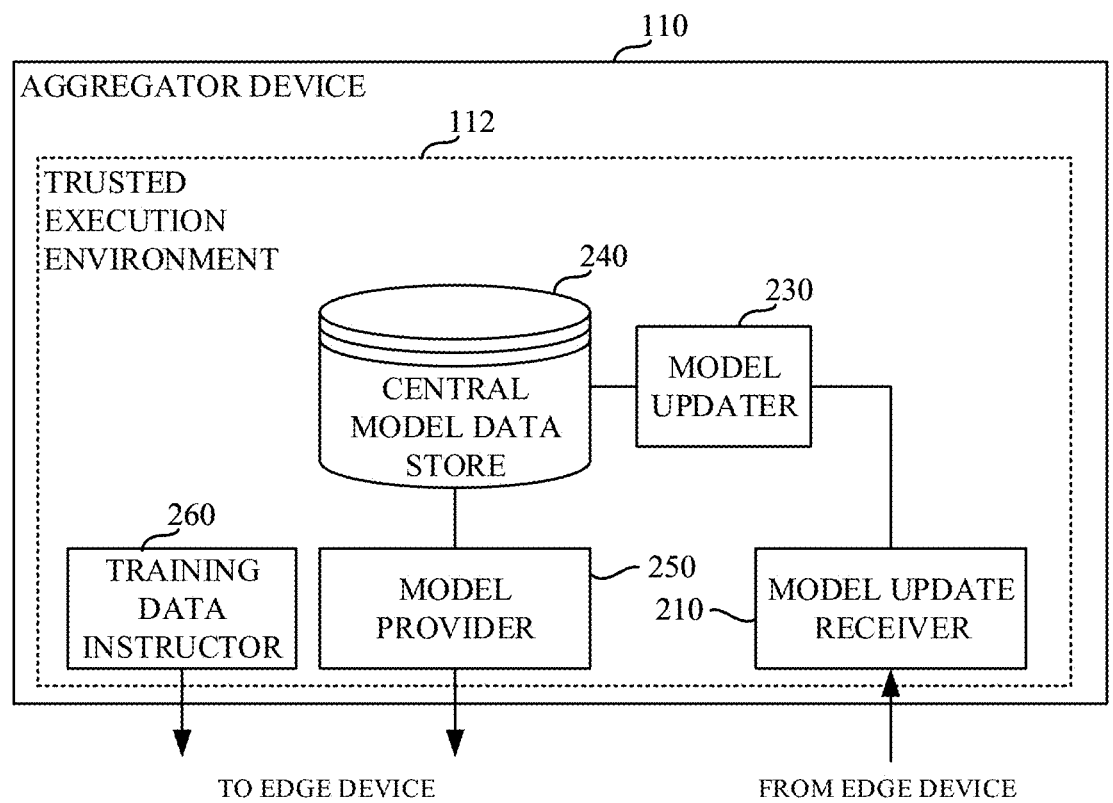
FIG. 2 is a block diagram of an example implementation of the example aggregator device of FIG. 1.

FIG. 2 is a block diagram of an example implementation of the example aggregator device 110 of FIG. 1. The example aggregator device 110 includes model update receiver 210, and model updater 230, central model data store 240, a model provider 250, and a training data instructor 260. In the illustrated example of FIG. 2, the example aggregator device 110 implements the example model update receiver 210, the example model updater 230, the example central model data store 240, the example model provider 250, and/or the example training data instructor 260 within the trusted execution environment 112. In some examples, the example model update receiver 210, the example model updater 230, the example central model data store 240, the example model provider 250, and/or the example training data instructor 260 may be implemented outside of the trusted execution environment 112.

The example model update receiver 210 of the illustrated example of FIG. 2 is implemented by a logic circuit such as, for example, a hardware processor. However, any other type of circuitry may additionally or alternatively be used such as, for example, one or more analog or digital circuit(s), logic circuits, programmable processor(s), application specific integrated circuit(s) (ASIC(s)), programmable logic device(s) (PLD(s)), field programmable logic device(s) (FPLD(s)), digital signal processor(s) (DSP(s)), etc. The example model update receiver 210 receives model updates from the edge devices 130, 135, 137. The example model update receiver 210 of the example aggregator device 110 aggregates the model updates provided by the edge devices 130, 135, 137. In some examples, the updates are aggregated as they arrive at the aggregator 110 (e.g., in a streaming average). In examples disclosed herein, the edge devices may implement trusted execution environments 132 such that the model updates from those edge devices may be trusted. However, in some examples the edge devices 130, 135, 137 might not implement trusted execution environments and, updates from those edge devices might not be trusted. When a model update is not trusted, additional checks are implemented to ensure that the model update does not maliciously affect the central model stored in the central model data store 240. For example, Byzantine Gradient Descent (BGD) may be used to exclude extreme model updates from affecting the central model. In some examples, a modified form of BGD may be applied that better excludes extreme model updates from affecting the central model based on whether model updates were provided by a trusted or untrusted edge device.

In some examples, the model update receiver 210 throttles the aggregation of updates. For example, the model update receiver 210 may determine whether a model update provided by an identified edge device has been used to update the central model in the past N rounds. Such throttling ensures that any given edge device is not allowed to have an excessive amount of influence on the central model. If the identified edge device has provided an update that has been used in the last N rounds, the example model update receiver 210 discards and/or ignores the model update from the edge device. If the identified edge device has not provided an update that has been used in the last N rounds, the example model update receiver 210 provides the received model update to the example model updater 230, thereby allowing the model update to be used when updating the central model, thereby allowing a given node to influence the central model stored in the central model data store 240 every N training iterations.

The example model updater 230 of the illustrated example of FIG. 2 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), DSP(s), etc. The example mode updater 230 updates the model stored in the central model data store 240. In examples disclosed herein, any model update approach may be used that does not require access to the data that was used to prepare the model update(s).

The example central model data store 240 of the illustrated example of FIG. 2 is implemented by any memory, storage device and/or storage disc for storing data such as, for example, flash memory, magnetic media, optical media, etc. Furthermore, the data stored in the example central model data store 240 may be in any data format such as, for example, binary data, comma delimited data, tab delimited data, structured query language (SQL) structures, etc. While in the illustrated example the central model data store 240 is illustrated as a single element, the example central model data store 240 and/or any other data storage elements described herein may be implemented by any number and/or type(s) of memories. In the illustrated example of FIG. 2, the central model data store 240 stores a central model that is updated by the model updater 230 based on model updates received from the edge devices. The central model stored by the central model data store 240 is transmitted to the edge devices by the model provider 250.

The example model provider 250 of the illustrated example of FIG. 2 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), DSP(s), etc. The example model provider 250 provides the current state of the machine learning model out to each edge device. In some examples, the model provider 250 provides additional instructions that accompany the model such as, for example, threshold values that are to be used by the edge device when training the model, processing queries against the model, and/or providing updates to the model to the aggregator device 110.

The example training data instructor 260 of the illustrated example of FIG. 2 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), DSP(s), etc. The example training data instructor 260 determines whether to allow edge devices to incorporate new training data in a given training round, and instructs the edge devices 130, 137 concerning the use of new training data for a given training round. In examples disclosed herein, the example training data instructor 260 allows new training data to be used every N rounds. However, any other approach to selecting when new training data will be allowed may additionally or alternatively be used. In examples disclosed herein, the determination of whether to allow new training data is made with respect to all edge devices. However, in some examples, the determination of whether to allow new training data may be made with respect to individual edge devices. In some examples, trusted edge devices (e.g., edge devices that implement a TEE) may be allowed to incorporate new training data more frequently than non-trusted edge devices (e.g., edge devices that do not implement a TEE).

Figure 3:
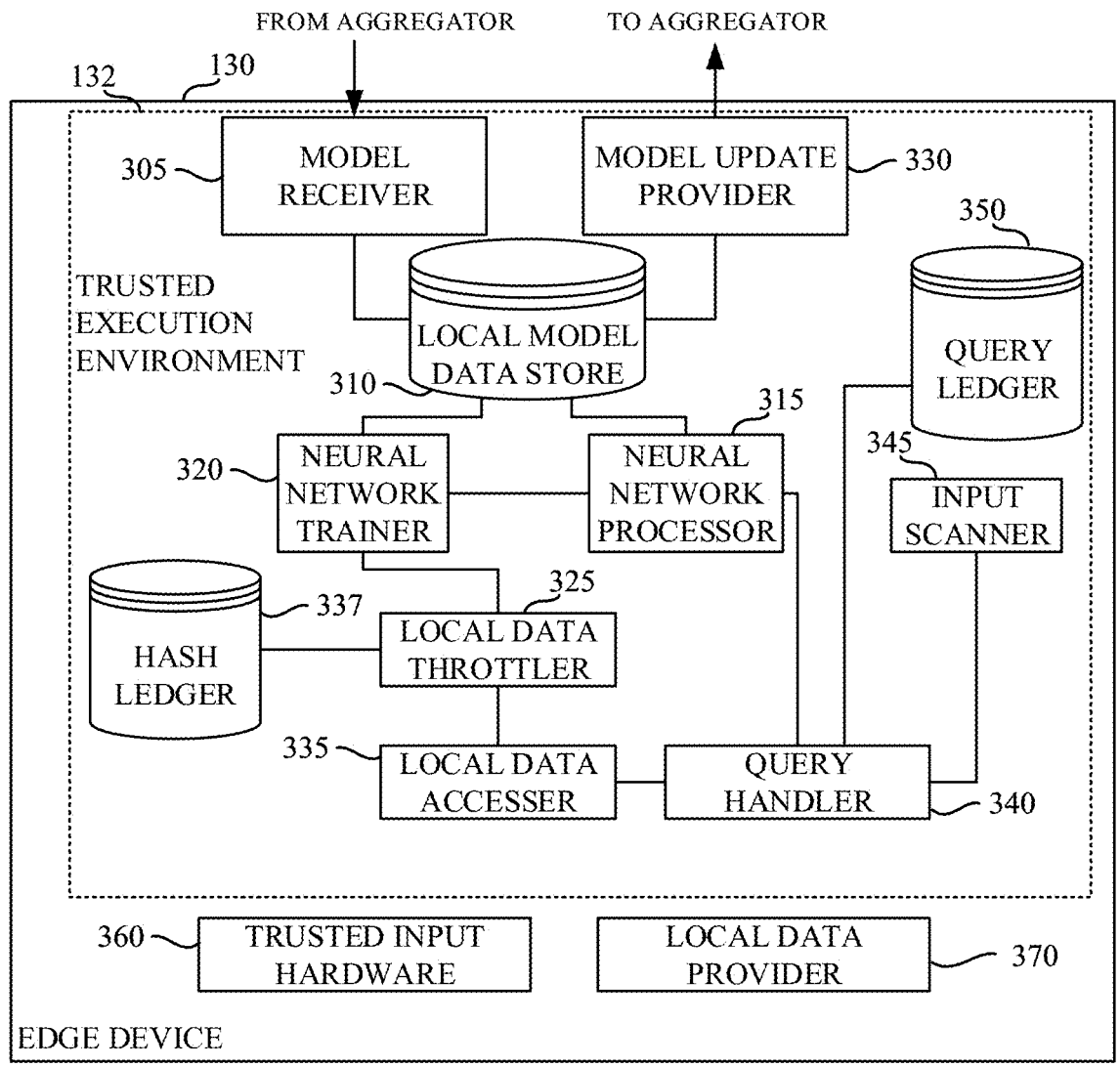
FIG. 3 is a block diagram of an example implementation of the example edge device of FIG. 1.

FIG. 3 is a block diagram of an example implementation of the example edge device 130 of FIG. 1. The example edge device 130 includes a model receiver 305, a local model data store 310, a neural network processor 315, a neural network trainer 320, a local data throttler 325, a model update provider 330, a local data accesser 335, a hash ledger 337, a query handler 340, an input scanner 345, a query ledger 350, trusted input hardware 360 and a local data provider 370.

In the illustrated example of FIG. 3, the example model receiver 305, the example local model data store 310, the example neural network processor 315, the example neural network trainer 320, the example local data throttler 325, the example model update provider 330, the example local data accesser 335, the example hash ledger 337, the example query handler 340, the example input scanner 345, and/or the example query ledger 350 are implemented within the trusted execution environment 132. However, in some examples, one or more of the example model receiver 305, the example local model data store 310, the example neural network processor 315, the example neural network trainer 320, the example local data throttler 325, the example model update provider 330, the example local data accesser 335, the example hash ledger 337, the example query handler 340, the example input scanner 345, and/or the example query ledger 350 may be implemented outside of the trusted execution environment 132. In some examples, the trusted input hardware 360 is implemented within the trusted execution environment 132.

The example local data provider 370 of the illustrated example of FIG. 3 is implemented outside of the trusted execution environment 132. However, in some examples, additional measures may be taken such that trust can be established between the components executed within the trusted execution environment 132 and the local data provider 370 executed outside of the trust execution environment.

The example model receiver 305 of the illustrated example of FIG. 3 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), DSP(s), etc. The example model receiver 305 receives the current state of the machine learning model (e.g., the central model stored in the central model data store 240 of the aggregator device 110). In some examples, additional instructions accompany the model such as, for example, threshold values that are to be used by the edge device when training the model, processing queries against the model, and/or providing updates to the model to the aggregator device 110. The example model receiver 305 stores the received model in the example local model data store 310.

The example local model data store 310 of the illustrated example of FIG. 3 is implemented by any memory, storage device and/or storage disc for storing data such as, for example, flash memory, magnetic media, optical media, etc. Furthermore, the data stored in the local model data store 310 may be in any data format such as, for example, binary data, comma delimited data, tab delimited data, structured query language (SQL) structures, etc. While in the illustrated example the local model data store 310 is illustrated as a single element, the example local model data store 310 and/or any other data storage elements described herein may be implemented by any number and/or type(s) of memories. In the illustrated example of FIG. 3, the local model data store 310 stores local model information received from the model receiver 305 and/or updated (e.g., trained) by the neural network trainer 320.

The example neural network processor 315 of the illustrated example of FIG. 3 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), DSP(s), etc. The example neural network processor 315 processor implements a neural network. The example neural network of the illustrated example of FIG. 3 is a deep neural network (DNN). However, any other past, present, and/or future neural network topology(ies) and/or architecture(s) may additionally or alternatively be used such as, for example, a convolutional neural network (CNN), a feed-forward neural network.

The example neural network trainer 320 of the illustrated example of FIG. 3 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), DSP(s), etc. The example neural network trainer 320 performs training of the neural network implemented by the neural network processor 315. In examples disclosed herein, training is performed using Stochastic Gradient Descent. However, any other approach to training a neural network may additionally or alternatively be used.

The example local data throttler 325 of the illustrated example of FIG. 3 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), DSP(s), etc. The example local data throttler 325 creates a hash of the new training data. In examples disclosed herein, an MD5 hash is used. However, any other hashing technique may additionally or alternatively be used. The example local data throttler 325 saves the hash in the hash ledger 337 in an uncommitted state. In the uncommitted state, the local training data corresponding to the stored hash is not allowed to be used in the training process.

The example local data throttler 325 determines, based on an instruction received from the aggregator device 110, whether to commit any uncommitted training data. In examples disclosed herein, the example aggregator device 110 may instruct the edge device to use new training data based on a number of training rounds that have elapsed since local data was allowed to be included in the training data. For example, additional local data may be allowed to be incorporated only every three training rounds. If the example local data throttler 325 determines that new training data will be allowed, the example local data throttler 325 commits the hashes stored in the hash ledger 337. The example local data throttler 325 transmits an acknowledgement message to the aggregator device 110 acknowledging the commitment of the training data.

In some examples, the local data throttler 325 is instructed that new local data should be committed every N training rounds. In such an example, the local data throttler 325 determines whether N training rounds have elapsed since additional and/or new local model data was allowed to be used as part of the model training process. In some examples, the value for N is provided by the example aggregator device 110 when transmitting the model to the edge device 130. If the example local data throttler 325 determines that N rounds have not yet elapsed, new local data is not allowed to be incorporated in the training process. If the example update transmission throttler 325 determines that the at least N training rounds have elapsed since the new local data was last allowed to be incorporated in the model training process, the example local data throttler 325 enables the inclusion of new local data in the model training process.

The example model update provider 330 of the illustrated example of FIG. 3 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), DSP(s), etc. The example model update provider 330 provides a model update to the example aggregator 110. In some examples, additional information is provided along with the model update such as, for example, an identity of the edge device 130, an indication of how much training data was used to prepare the model update, and/or other parameters identified as part of the model training process.

The example local data accesser 335 of the illustrated example of FIG. 3 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), DSP(s), etc. The example local data accesser 335 accesses local data to be used for training. In some examples, the local data is provided by trusted input hardware (e.g., trusted input hardware 360), and is trusted such that the local data may be used for training purposes. However, in some examples, the local data may originate from an entity (e.g., a program, a device, etc.) other than the trusted input hardware (e.g., the local data provider 370).

The example hash ledger 337 of the illustrated example of FIG. 3 is implemented by any memory, storage device and/or storage disc for storing data such as, for example, flash memory, magnetic media, optical media, etc. Furthermore, the data stored in the hash ledger 337 may be in any data format such as, for example, binary data, comma delimited data, tab delimited data, structured query language (SQL) structures, etc. While in the illustrated example the hash ledger 337 is illustrated as a single element, the example hash ledger 337 and/or any other data storage elements described herein may be implemented by any number and/or type(s) of memories. In the illustrated example of FIG. 3, the hash ledger 337 stores hashes of local training data to facilitate a determination by the local data accesser 335 of whether to use local data for training purposes.

The example query handler 340 of the illustrated example of FIG. 3 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), DSP(s), etc. The example query handler 340 handles queries received from the trusted input hardware 360 and/or the local data provider 370. The example query handler 340 determines whether the query source is trusted. In examples disclosed herein, the query source is trusted when the query originates from the trusted input hardware 360, and the query source is not trusted when the query originates from the local data provider 370. However, any other approach for determining whether the query source is trusted may additionally or alternatively be used such as, for example, validating a hash provided with the query. If the query sources not trusted, the example query handler 340 stores a record of the query in the query ledger 350, and performs additional analysis of the query to determine whether to allow it to be processed. In some examples, the query is throttled based on receipt of other queries (e.g., previously submitted queries). In some examples, the query handler 340 interacts with the input scanner 345 to determine whether the input appears to be synthetic. In some examples, the query handler 340 determines an amount of information that would be expected to be leaked if the query were to be allowed to execute. Upon execution of the query, the query handler 340 provides the result to the entity that provided the query.

The example input scanner 345 of the illustrated example of FIG. 3 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), DSP(s), etc. The example input scanner 345 analyzes the received query to determine whether the input appears to be synthetic. Reverse engineering attacks on federated models will typically involve synthesized data of some sort, as the attacker does not have access to the full training dataset. Synthesized data may appear statistically different than real data (e.g., the local data used to train the model). In examples disclosed herein, the input scanner 345 compares the query data to prior training data identified by the hashes stored in the hash ledger 337 (and/or hashes representing the query and/or prior training data). In examples disclosed herein, a query is considered to be synthetic based on its similarity to the local data that was used to train the model. In some examples, similarity to local data may be determined based on respective hashes of the prior queries as compared to a hash of the received query. If the query appears to be synthetic, the example query handler 340 rejects the query.

The example query ledger 350 of the illustrated example of FIG. 3 is implemented by any memory, storage device and/or storage disc for storing data such as, for example, flash memory, magnetic media, optical media, etc. Furthermore, the data stored in the example query ledger 350 may be in any data format such as, for example, binary data, comma delimited data, tab delimited data, structured query language (SQL) structures, etc. While in the illustrated example the example query ledger 350 is illustrated as a single element, the example query ledger 350 and/or any other data storage elements described herein may be implemented by any number and/or type(s) of memories. In the illustrated example of FIG. 3, the example query ledger 350 stores records of prior queries that enable the query handler 340 to identify when queries were received and/or executed.

The example trusted input hardware 360 of the illustrated example of FIG. 3 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), DSP(s), etc. The example trusted input hardware 360 is hardware that is trusted by the local data accesser 335. In examples disclosed herein, trust is established based on pre-exchanged keys and/or hashes. However, trust may be established using any past, present, and/or future approaches.

The example local data provider 370 of the illustrated example of FIG. 3 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), DSP(s), etc. The example local data provider 370 represents an entity (e.g., a program, a device, etc.) that is not able to establish trust with the local data accesser 335. In examples disclosed herein, because trust between the local data provider 370 and the local data accesser 335 is not established, additional validations are performed before allowing queries submitted by the local data provider 370 and/or training data submitted by the local data provider 370 to be processed.

While an example manner of implementing the example aggregator device 110 of FIG. 1 is illustrated in FIG. 2, one or more of the elements, processes and/or devices illustrated in FIG. 2 may be combined, divided, re-arranged, omitted, eliminated and/or implemented in any other way. Further, the example model update receiver 210, the example model updater 230, the example central model data store 240, the example model provider 250, and/or more generally, the example aggregator device 110 of FIG. 2 may be implemented by hardware, software, firmware and/or any combination of hardware, software and/or firmware. Thus, for example, any of the example model update receiver 210, the example model updater 230, the example central model data store 240, the example model provider 250, and/or more generally, the example aggregator device 110 of FIG. 2 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example model update receiver 210, the example model updater 230, the example central model data store 240, the example model provider 250, and/or more generally, the example aggregator device 110 of FIG. 2 is/are hereby expressly defined to include a non-transitory computer readable storage device or storage disk such as a memory, a digital versatile disk (DVD), a compact disk (CD), a Blu-ray disk, etc. including the software and/or firmware. Further still, the example aggregator device 110 of FIGS. 1 and/or 2 may include one or more elements, processes and/or devices in addition to, or instead of, those illustrated in FIG. 2, and/or may include more than one of any or all of the illustrated elements, processes and devices.

While an example manner of implementing the edge device 130 of FIG. 1 is illustrated in FIG. 3, one or more of the elements, processes and/or devices illustrated in FIG. 3 may be combined, divided, re-arranged, omitted, eliminated and/or implemented in any other way. Further, the example model receiver 305, the example local model data store 310, the example neural network processor 315, the example neural network trainer 320, local data throttler 325, the example model update provider 330, the example local data accesser 335, the example hash ledger 337, the example query handler 340, the example input scanner 345, the example query ledger 350, the example trusted input hardware 360, the example local data provider 370, and/or, more generally, the example edge device 130 of FIGS. 1 and/or 3 may be implemented by hardware, software, firmware and/or any combination of hardware, software and/or firmware. Thus, for example, any of the example model receiver 305, the example local model data store 310, the example neural network processor 315, the example neural network trainer 320, the example local data throttler 325, the example model update provider 330, the example local data accesser 335, the example hash ledger 337, the example query handler 340, the example input scanner 345, the example query ledger 350, the example trusted input hardware 360, the example local data provider 370, and/or, more generally, the example edge device 130 of FIGS. 1 and/or 3 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example model receiver 305, the example local model data store 310, the example neural network processor 315, the example neural network trainer 320, the example local data throttler 325, the example model update provider 330, the example local data accesser 335, the example hash ledger 337, the example query handler 340, the example input scanner 345, the example query ledger 350, the example trusted input hardware 360, the example local data provider 370, and/or, more generally, the example edge device 130 of FIGS. 1 and/or 3 is/are hereby expressly defined to include a non-transitory computer readable storage device or storage disk such as a memory, a digital versatile disk (DVD), a compact disk (CD), a Blu-ray disk, etc. including the software and/or firmware. Further still, the example edge device 130 of FIGS. 1 and/or 3 may include one or more elements, processes and/or devices in addition to, or instead of, those illustrated in FIG. 3, and/or may include more than one of any or all of the illustrated elements, processes and devices.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 4:
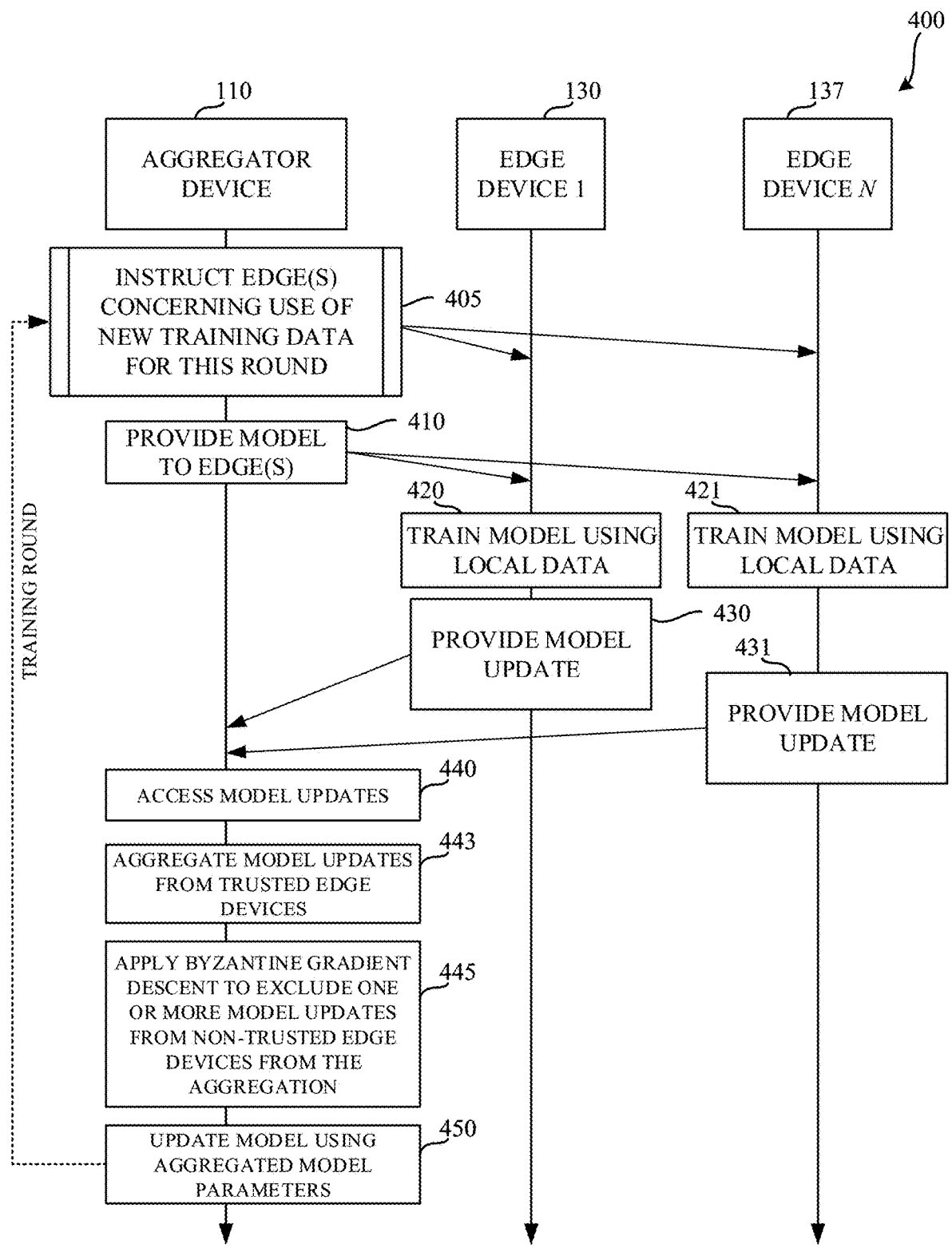
FIG. 4 is a communication diagram representing operations performed at the example aggregator device and/or the example edge devices of FIG. 1.

A flowchart representative of example hardware logic or machine readable instructions for implementing the example aggregator device 110 of FIG. 2 is shown in FIGS. 4 and/or 4A. The machine readable instructions may be a program or portion of a program for execution by a processor such as the processor 712 shown in the example processor platform 700 discussed below in connection with FIG. 7. The program may be embodied in software stored on a non-transitory computer readable storage medium such as a CD-ROM, a floppy disk, a hard drive, a DVD, a Blu-ray disk, or a memory associated with the processor 712, but the entire program and/or parts thereof could alternatively be executed by a device other than the processor 712 and/or embodied in firmware or dedicated hardware. Further, although the example program is described with reference to the flowchart illustrated in FIGS. 4 and/or 4A, many other methods of implementing the example aggregator device 110 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

Figure 5A:
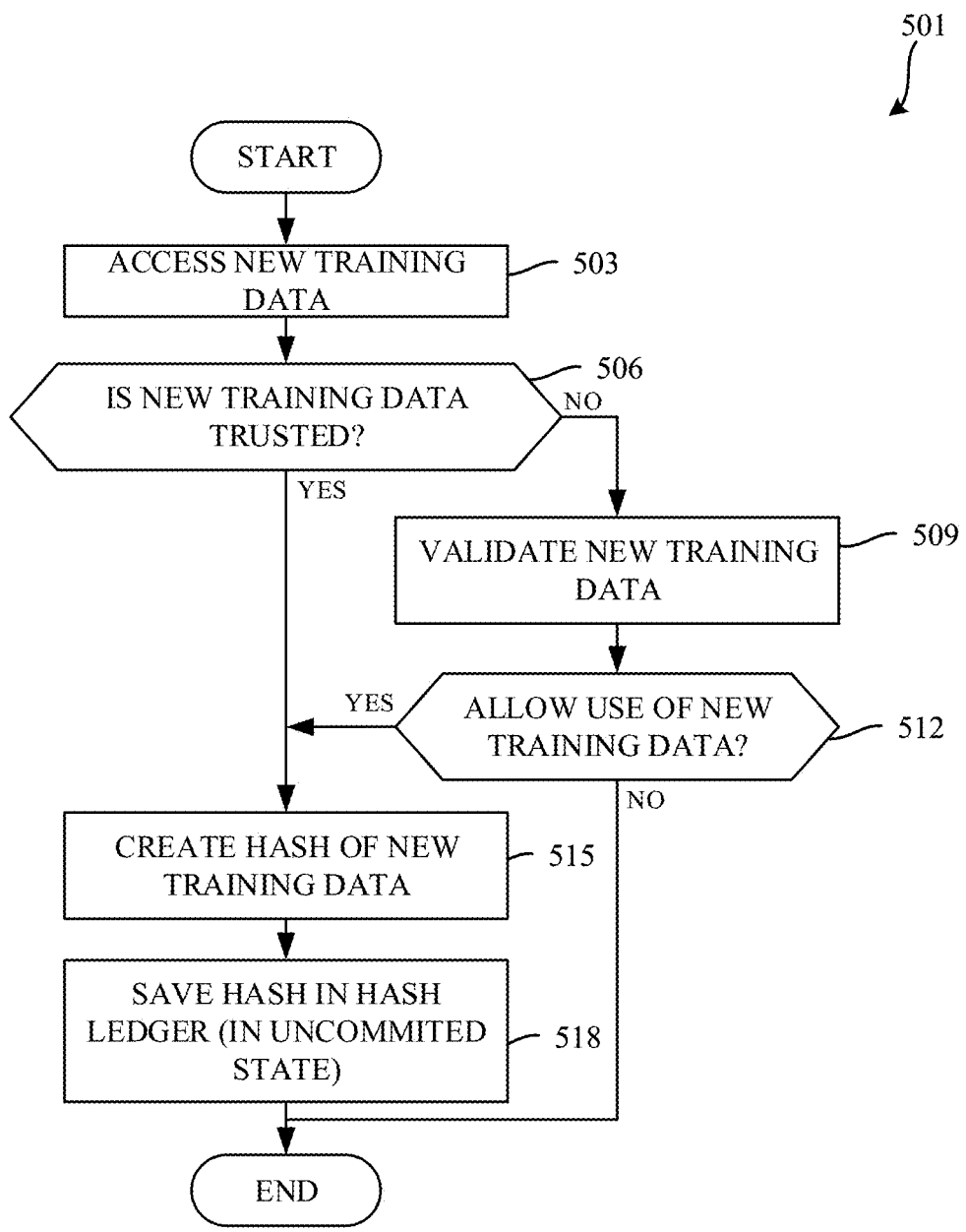
FIG. 5A is a flowchart representative of machine readable instructions which may be executed to implement the example edge device of FIGS. 1 and/or 3 to handle new local training data.
Figure 5B:
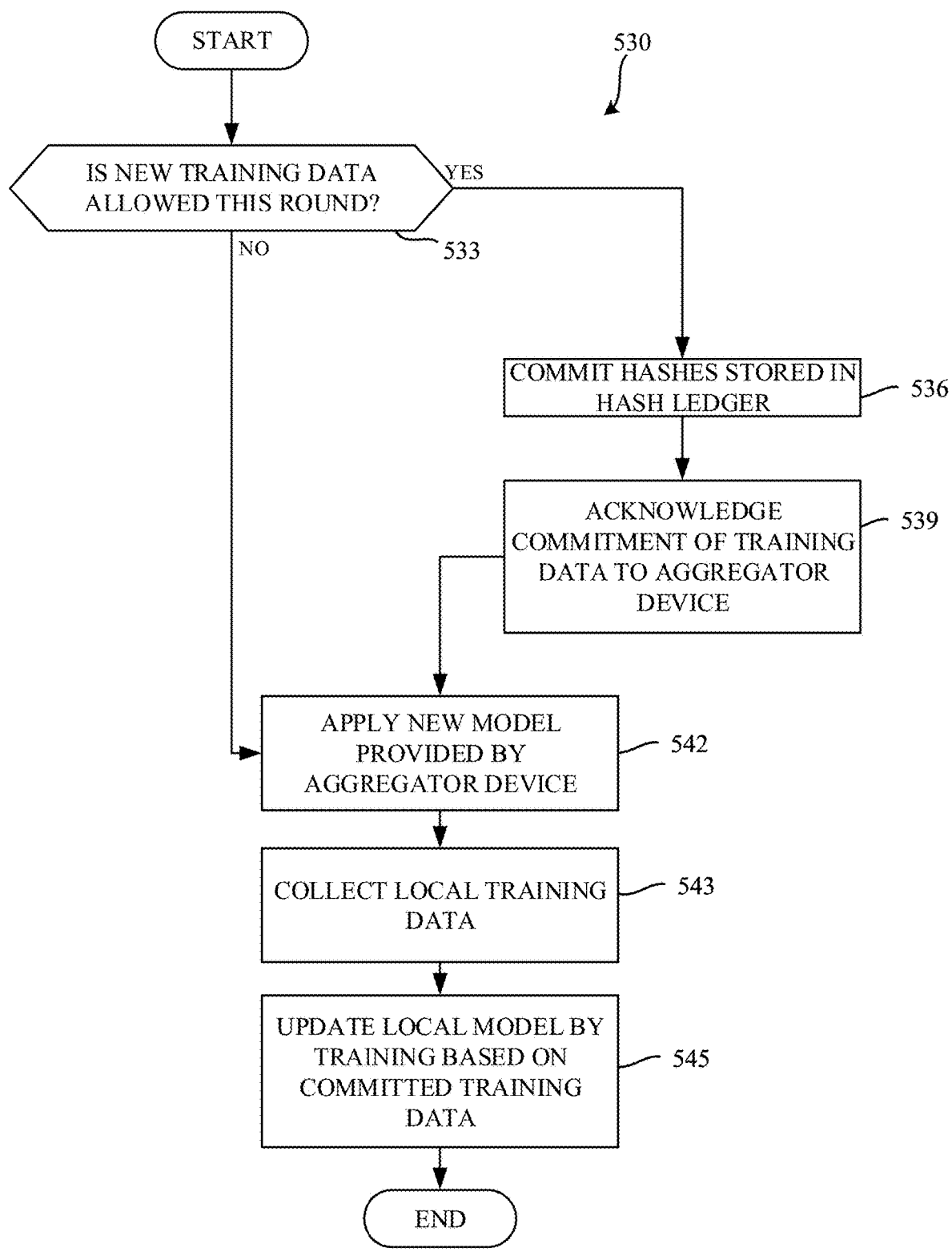
FIG. 5B is a flowchart representative of machine readable instructions which may be executed to implement the example edge device of FIGS. 1 and/or 3 to locally train a neural network.

Flowcharts representative of example hardware logic or machine readable instructions for implementing the example edge device 130 of FIG. 3 are shown in FIGS. 4, 5A, 5B, and/or 6. The machine readable instructions may be a program or portion of a program for execution by a processor such as the processor 812 shown in the example processor platform 800 discussed below in connection with FIG. 8. The program may be embodied in software stored on a non-transitory computer readable storage medium such as a CD-ROM, a floppy disk, a hard drive, a DVD, a Blu-ray disk, or a memory associated with the processor 812, but the entire program and/or parts thereof could alternatively be executed by a device other than the processor 812 and/or embodied in firmware or dedicated hardware. Further, although the example program is described with reference to the flowchart illustrated in FIGS. 4, 5A, 5B, and/or 6, many other methods of implementing the example edge device 130 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example processes of FIGS. 4, 4A, 5A, 5B, and/or 6 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, and (6) B with C.

FIG. 4 is a communication diagram representing operations 400 performed at the example aggregator device 110 and/or the example edge devices 130, 137 of FIG. 1. The example process 400 of FIG. 4 begins when the example training data instructor 260 of the example aggregator device 110 instructs the edge devices 130, 137 concerning the use of new training data for the instant training round. (Block 405). An example approach for instructing the edge devices 130, 137 is disclosed below in connection with FIG. 4A. The example model provider provides the current state of the machine learning model out to each edge device. (Block 410). The model provided by the aggregator device 110 may be initialized in any way (including pre-training on public data), or may be the model learned in a previous training round.

Each edge 130, 137 trains the model using local data. (Block 420, 421). In examples disclosed herein, the neural network trainer 320 of the example edge device 130 instructs the neural network processor 315 to train using the local data accessed by the local data accesser 335. As a result of the training, a model update for that training round is created and is stored in the local model data store 310. In examples disclosed herein, the model update can be computed with any sort of model learning algorithm such that the aggregation function does not require access to the original data such as, for example, Stochastic Gradient Descent.

Each edge 130, 137 transmits its model update to the aggregator device 110 for aggregation. (Blocks 430, 431). The example model update receiver 210 of the example aggregator device 110 accesses the results provided by the edge devices 130, 137. (Block 440). In some examples, the model updates are aggregated as they arrive at the aggregator 110 (e.g., in a streaming average). In some examples, Byzantine Gradient Descent is used to exclude extreme model update results. In the illustrated example of FIG. 4, the example model update receiver 210 aggregates model updates from trusted edge devices. (Block 443). That is, if a model update is received from a trusted edge device (e.g., an edge device that implements a trusted execution environment), it is automatically included in the aggregation. The example model update receiver 210, applies Byzantine Gradient Descent to model updates that originate from non-trusted edge devices. (Block 445), Applying Byzantine Gradient Descent to model updates originating from non-trusted edge devices enables elimination of extreme model updates (which may potentially be malicious). In some examples, the model update receiver 210 throttles the aggregation of updates, thereby allowing a given node to influence the central model stored in the central model data store 240 every N training iterations.

Using the aggregated model updates, the example model updater 230 of the example aggregator device 110 updates the model stored in the central model data store 240. (Block 450). The updated model then serves as a new model for the next training iteration, and control proceeds to block 410 where the process of FIG. 4 is repeated. In examples disclosed herein, each transition from block 450 to 410 is referred to as a round and/or a training iteration. By allowing multiple rounds to be performed, the example system enables models to be adjusted over time to adapt to changing input data.

Figure 4A:
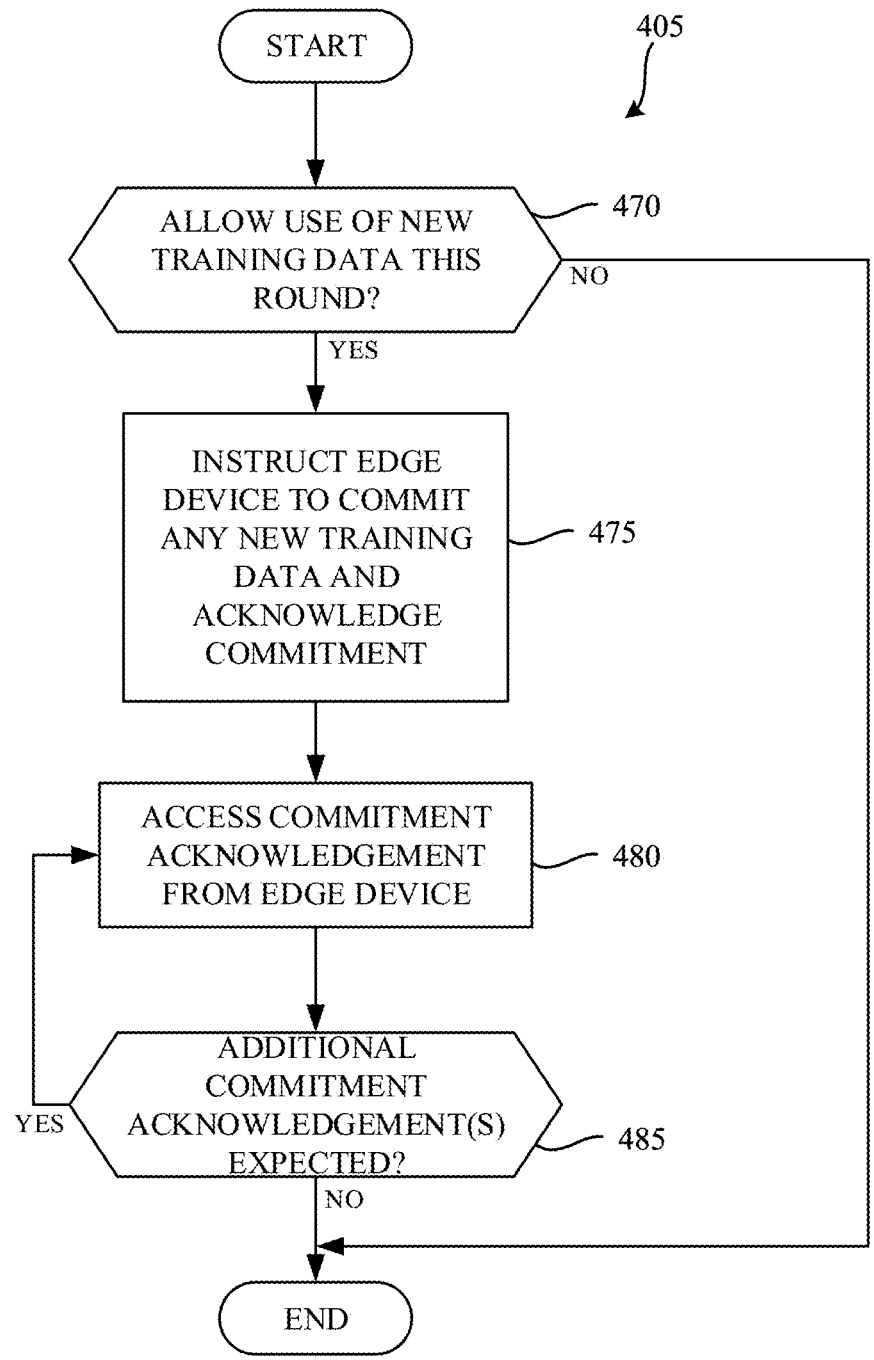
FIG. 4A is a flowchart representative of machine readable instructions which may be executed to implement the example aggregator device of FIG. 1 to instruct the edge device concerning use of new training data for a given training round.

FIG. 4A is a flowchart representative of machine readable instructions which may be executed to implement the example aggregator device 110 of FIG. 1 to instruct the edge device concerning use of new training data for a given training round. The example process 405 of the illustrated example of FIG. 4A begins when the example training data instructor 260 determines whether to allow edge devices to incorporate new training data in this round. (Block 470). In examples disclosed herein, the example training data instructor 260 allows new training data to be used every N rounds. However, any other approach to selecting when new training data will be allowed may additionally or alternatively be used. In the illustrated example of FIG. 4A, the determination of whether to allow new training data is made with respect to all edge devices. However, in some examples, the determination of whether to allow new training data may be made with respect to individual edge devices. In some examples, trusted edge devices (e.g., edge devices that implement a TEE) may be allowed to incorporate new training data more frequently than non-trusted edge devices (e.g., edge devices that do not implement a TEE).

If the example training data instructor 260 determines that no new training data is allowed (e.g., block 470 returns a result of NO), the example process of FIG. 4A terminates. Control then proceeds back to block 410 of FIG. 4, where the model provider 250 provides the model to be used for training to the edge device(s).

If the example training data instructor 260 determines that new training data will be allowed (e.g., block 470 returns a result of YES), the example training data instructor 260 transmits an instruction to the edge device(s) to commit any new training data that has been collected. (Block 475). The commitment of new training data at the edge device is described below in connection with FIG. 5B. In examples disclosed herein, the example training data instructor 260 requests each of the edge devices that are including new training data to acknowledge the commitment. The example training data instructor 260 receives commitment message(s) from those corresponding edge device(s). (Block 480). The example training data instructor 260 determines whether additional commitment messages are expected to be received. (Block 485). If additional commitment messages are expected (e.g., block 485 returns a result of YES), the example training data instructor 260 continues to receive those commitment messages. (Block 480).

Once all expected commitment messages are received (e.g., block 485 returns a result of NO), the example process of FIG. 4A terminates. Control then proceeds back to block 410 of FIG. 4, where the model provider 250 provides the model to be used for training to the edge device(s).

FIG. 5A is a flowchart representative of machine readable instructions 501 which may be executed to implement the example edge device 130 of FIGS. 1 and/or 3 to accept new local training data. The example process 501 of the illustrated example of FIG. 5 begins when the example local data accesser 335 receives new training data. (Block 503). In examples disclosed herein, the training data may be received from the trusted input hardware 360 and/or the local data provider 370. The example local data accesser 335 determines whether the new training data is trusted. (Block 506). In some examples, the training data is provided by trusted input hardware (e.g., trusted input hardware 360), and is trusted such that the training data may be used for training purposes. However, in some examples, the training data may originate from an entity (e.g., a program, a device, etc.) other than the trusted input hardware (e.g., the local data provider 370), and may undergo additional checks to determine whether the training data will be used. In examples disclosed herein, the example local data accesser 335 determines that the new local data is trusted when it originates from the trusted hardware 360. However, any other approach to determining whether the new training data is trusted may additionally or alternatively be used.

If the training data is not trusted (e.g., block 506 returns a result of NO), the example local data accesser 335 validates the new training data. (Block 509). In examples disclosed herein, validation may be performed by, for example, comparing the training data against previously submitted training data. However, any other approach to validating training data may additionally or alternatively be used.

Based on the validation of block 509, the example local data accesser 335 determines whether to allow use of the new training data. (Block 512). If the new training data is not allowed to be used (e.g., block 512 returns a result of NO), the example process of FIG. 5A terminates. If the new training data is allowed to be used (e.g., block 512 returns a result of YES), or if the new training data is trusted (e.g., block 506 returns a result of YES), the example local data throttler 325 creates a hash of the new training data. (Block 515). In examples disclosed herein, an MD5 hash is used. However, any other hashing technique may additionally or alternatively be used.

The example local data throttler 325 saves the hash in the hash ledger 337 in an uncommitted state. (Block 518). In the uncommitted state, the local training data corresponding to the stored hash is not allowed to be used in the training process. As disclosed in connection with FIG. 5B, the hash may later be committed to thereby allow use of the new training data.

FIG. 5B is a flowchart representative of machine readable instructions 530 which may be executed to implement the example edge device 130 of FIGS. 1 and/or 3 to locally train a neural network at an edge device. The example process 530 of FIG. 5B corresponds to blocks 420 and/or 421 of FIG. 4. The example process 540 of FIG. 5B begins when the example local data throttler 325 determines, based on an instruction received from the aggregator device 110 (e.g., the instruction transmitted by the example aggregator device 110 in connection with block 405 of FIG. 4), whether to commit any uncommitted training data. (Block 533). In examples disclosed herein, the example aggregator device 110 may instruct the edge device to use new training data based on a number of training rounds that have elapsed since local data was allowed to be included in the training data. For example, additional local data may be allowed to be incorporated only every three training rounds.

If the example local data throttler 325 determines that new training data will be allowed (e.g., block 533 returns a result of YES), the example local data throttler 325 commits the hashes stored in the hash ledger 337. (Block 536).

The example local data throttler 325 then transmits an acknowledgement message to the aggregator device 110 acknowledging the commitment of the training data. (Block 539). With reference to blocks 480 and 485 of FIG. 4A, the example aggregator device 110 awaits expected acknowledgement messages, and proceeds to send the latest model to the edge devices. The example model receiver 305 receives the model and stores the model in the local model data store 310. (Block 542). Delaying incorporation of the model ensures that any new training data be submitted before the model is utilized for training, thereby mitigating reverse-engineering attacks that might occur on the new parameters. For example, many subtle poisoning attacks, such as the kind that can get past robust aggregation (e.g., that are not filtered out at the aggregator using Byzantine Gradient Descent), must be constantly updated to prevent the model from correcting such poisoning naturally. Even a single training round without an update to the poisoned data can correct the poisoning for such attacks. In examples disclosed herein, multiple training rounds occur on the same local data (e.g., uncommitted training data) before new local training data may be utilized.

Returning to block 533, in the event that the example local data throttler 325 determines that no new training data will be allowed in the instant training round (e.g., block 533 returns a result of NO), the example model receiver 305 receives the model and stores the model in the local model data store 310. In some examples, multiple versions of the model may be stored in the example model data store 310 to, for example, allow for training to be performed based on the latest central model, but querying to be performed based on a prior model (to reduce the likelihood that a model could be discovered via a training-based attack.

If the example local data throttler 325 determines that new training data will not be allowed (e.g., block 533 returns a result of NO), the example local data accesser 335 applies the model received from the aggregator device 110. (Block 542). The example local data accesser 335 collects the local training data that is to be used during training of the model. (Block 543). In examples disclosed herein, a hash of the local training data is compared against the committed hashes stored in the hash ledger 337 by the local data accesser 335. Only those local data items having corresponding hashes stored in the hash ledger 337 are allowed to be used for training. That is, if the local data accesser 335 determines that the hash of the local training data does not match any of the committed hashes of the prior training data (e.g., suggesting that the local training data has been tampered with), that local training data is not allowed to be used for training. For example, using an adaptive data the attack, an attacker may submit different training data rapidly in an attempt to damage the integrity of the model.

The example neural network trainer 320 trains the model implemented by the neural network processor 315. (Block 545). In examples disclosed herein, the neural network trainer 320 trains the model using local training data collected by the local data accesser 335. After training is complete, control proceeds to blocks 430 and/or 431 of FIG. 4, where the example model update provider 330 provides a model update to the example aggregator 110. (Block 545).

While in the illustrated example of FIG. 5, hashes are used to determine whether to allow training based on locally received training data, other techniques for determining whether to permit training may additionally or alternatively be used. For example, the training data may be compared to previously provided training data to determine a degree of similarity to the prior training data. If the newly provided training data is similar to previously submitted training data, such similarity suggests that the training data is legitimate (as training data is not expected to widely vary from one training iteration to the next). On the contrary, if the training data is not similar to previously submitted training data, such non-similarity suggests that the training data may have been tampered with in an effort to maliciously impact the model.

Figure 6:
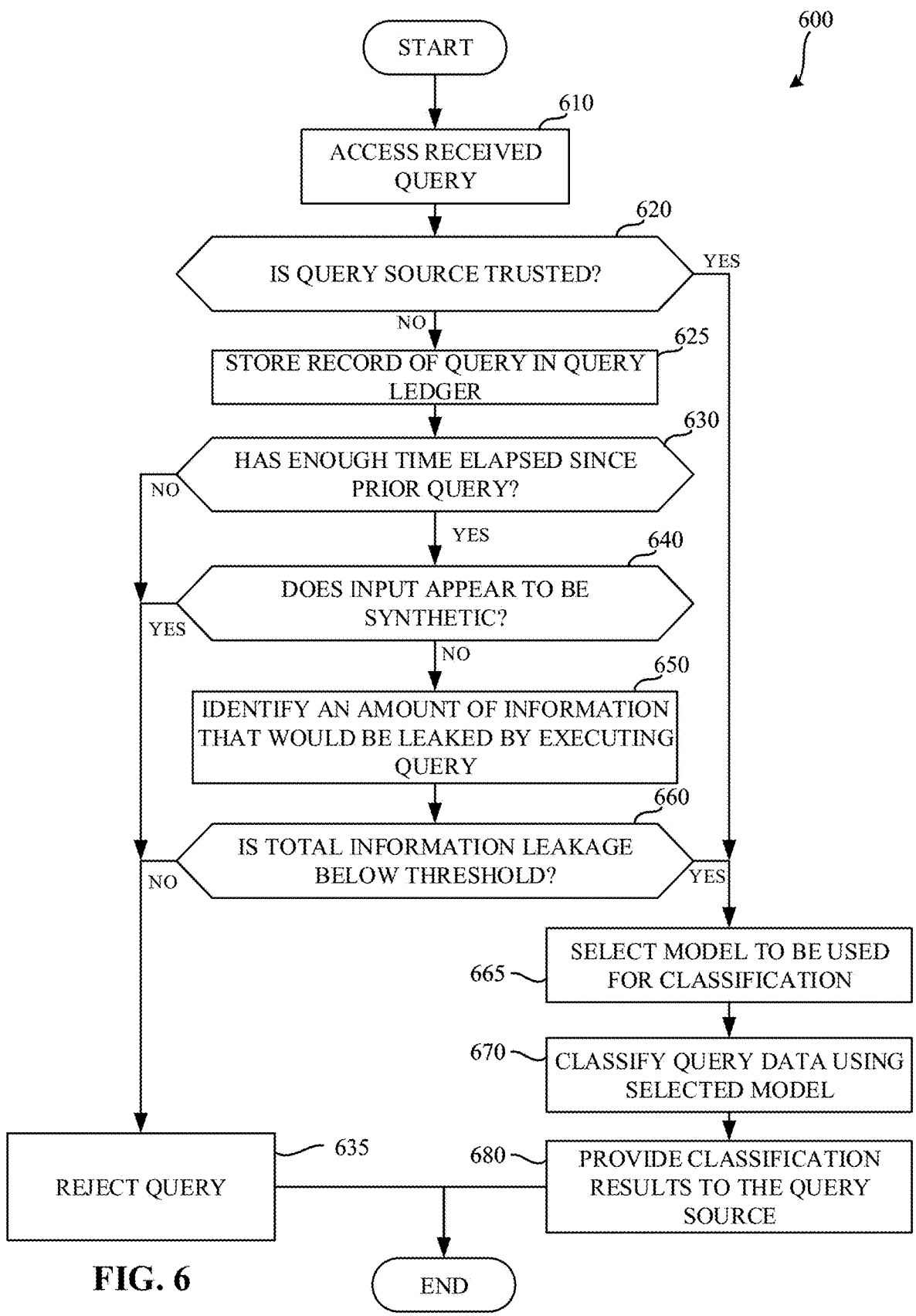
FIG. 6 is a flowchart representative of machine readable instructions which may be executed to implement the example edge device of FIGS. 1 and/or 3 to utilize the neural network to classify input data.

FIG. 6 is a flowchart representative of machine readable instructions 600 which may be executed to implement the example edge device 130 of FIGS. 1 and/or 3 to utilize the neural network to classify input data. The example process 600 the illustrated example of FIG. 6 begins when the example query handler 340 accesses a received query. (Block 610). In examples disclosed herein, the received query may originate from trusted input hardware 360 or the local data provider 370. That is, the query may originate from a trusted source or a non-trusted source. Many TEEs provide roots of trust from which to establish secure channels. If the model queries are originating from known, trusted endpoints, then the system can know a priori whether these queries are possibly part of a reverse engineering attack. A query from a non-trusted source may, for example, be an attack to attempt to discover the model stored in the local model data store 310. If the query were to originate from a non-trusted source, additional checks are put in place before allowing the query to be executed.

The example query handler 340 determines whether the query source is trusted. (Block 620). In examples disclosed herein, the query source is trusted when the query originates from the trusted input hardware 360, and the query sources not trusted when the query originates from the local data provider 370. However, any other approach for determining whether the query sources is trusted may additionally or alternatively be used such as, for example, validating a hash provided with the query. If the query sources not trusted (e.g., block 620 returns a result of NO), the example query handler 340 stores a record of the query in the query ledger 350. (Block 625). The records stored in the example query ledger 350 enables the query handler 340 to identify when queries were received and/or executed.

The example query handler 340 determines whether enough time has elapsed since a prior query. (Block 630). Reverse engineering attacks typically require far more model queries than legitimate use cases, especially when the attacker does not have access to the data used to train the model (a typical precondition of federated learning systems). Many TEEs provide trusted time services where the code executing in the TEE can be assured how much time has passed since the code began executing. In examples disclosed herein, such trusted time components are used to ensure a maximum total number of queries per second that would suffice for the use case, but severely limit reverse engineering attacks. In examples disclosed herein, the query handler 340 compares a timestamp representing a time at which the query was received against timestamp stored in the query ledger 350. In examples disclosed herein, the example query handler 340 determines that enough time is elapsed since a prior query when the smallest difference between the timestamp of the present query and any prior query stored in the example query ledger 350 is greater than a threshold amount of time. In examples disclosed herein the threshold amount of time is one query per second. However, any other threshold may additionally or alternatively be used. Using a threshold amount of time ensures that untrusted query sources are not allowed to repeatedly submit queries in an attempt to discover the model stored in the local model data store 310. The success of this validation greatly depends on the query rate (e.g., threshold amount of time) required to meet the intended functionality and the query rate required to attack the system. Put another way, a "query budget" is used that is intended to be sufficient for legitimate tasks, but insufficient for reverse engineering attacks.

If the example query handler 340 determines that enough time has not elapsed since the prior query (e.g., block 630 returns a result of NO), the example query handler 340 rejects the query. (Block 635). In examples disclosed herein, the query handler 340 provides a message to the query source indicating that the query has been rejected. However, in some examples, no response message is provided to the query source.

If the example query handler 340 determines that enough time has elapsed since the prior query (e.g., block 630 returns a result of YES), the example input scanner 345 analyzes the received query to determine whether the input appears to be synthetic. (Block 640). Reverse engineering attacks on federated models will typically involve synthesized data of some sort, as the attacker does not have access to the full training dataset. Synthesized data may appear statistically different than real data (e.g., the local data used to train the model). That is, the same TEE 132 training and running queries against the model would provide the very integrity needed to run such input analysis-based reverse engineering detection. In examples disclosed herein, a query is considered to be synthetic based on its similarity to the local data that was used to train the model. In some examples, similarity to local data may be determined based on respective hashes of the prior queries as compared to a hash of the received query. If the query appears to be synthetic (e.g., block 640 returns a result of YES), the example query handler 340 rejects the query. (Block 635).

If the query does not appear to be synthetic (e.g., block 640 returns result of NO), the example input scanner determines an amount of information that would be leaked by executing and/or providing a response to the query. (Block 650). The example input scanner 345 determines whether the amount of information that may be leaked by executing and or providing a response to the query is below a threshold. (Block 660). In some examples, the example input scanner 345 computes an amount of information that may be leaked with respect to the individual query that has been requested to be executed. Amounts of information leakage on any other time scale may additionally or alternatively be used such as, for example, for the lifetime of the operation of the edge device, over a past amount of time (e.g., ten minutes, one hour, one week), with respect to the current model stored in the local model data store 310, etc. If the total amount of information leakage is above the threshold (e.g., block 660 returns a result of NO), the example query handler rejects the query. (Block 635).

If the total amount of information leakage is below the threshold (e.g., block 660 returns a result of YES), or if the query source is trusted (e.g., block 620 returns a result of YES), then the query will be processed. The example query handler 340 selects a model to be used for the processing of the query. (Block 665). In examples disclosed herein, the model from the model from the prior training round is selected. Selecting the model from the prior training round ensures that a model that may have been modified by training that may have occurred at the edge device is not used. Moreover, such an approach reduces the likelihood that the selected model might be discovered by repeatedly querying the model. In some examples, the aggregator device may restrict the ability to train a model at a particular edge device (e.g., an edge device may only be allowed to train every N rounds), in which case, the query handler 340 may select the most recent model provided by the aggregator device 110 during a non-training round. In some examples, the selected model may be the model of the current round (e.g., if training is not enabled for that edge device for that round).

The example query handler 340 causes the neural network to classify the input data using the selected model stored in the local model data store 310. (Block 670). The example query handler 340 then provides a classification results to the query source. (Block 680). The example process 600 the illustrated example of FIG. 6 then terminates. The example process 600 the illustrated example of FIG. 6 may then be repeated upon subsequent receipt of a query.

Figure 7:
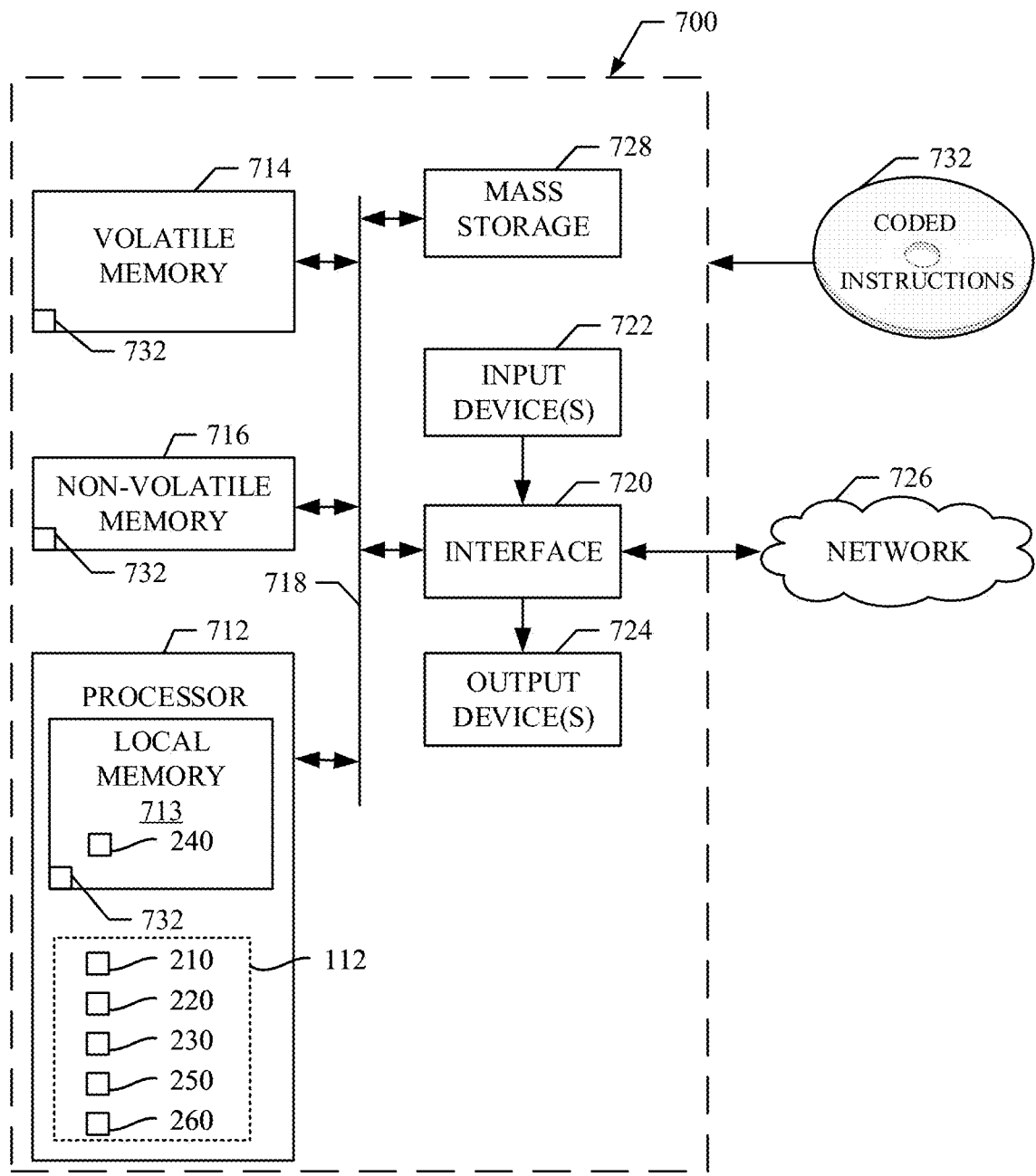
FIG. 7 is a block diagram of an example processing platform structured to execute the instructions of FIG. 4 to implement the example aggregator device of FIGS. 1 and/or 2.

FIG. 7 is a block diagram of an example processor platform 700 structured to execute the instructions of FIGS. 4 and/or 4A to implement the example aggregator device 110 of FIGS. 1 and/or 2. The processor platform 700 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 700 of the illustrated example includes a processor 712. The processor 712 of the illustrated example is hardware. For example, the processor 712 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example model update receiver 210, the example model updater 230, and/or the example model provider 250. In some examples, the example model update receiver 210, the example model updater 230, the example model provider 250, and/or the example training data instructor 260 are implemented within the trusted execution environment 112.

The processor 712 of the illustrated example includes a local memory 713 (e.g., a cache). The local memory 713 implements the example model data store 240 (which may be implemented as a part of the trusted execution environment 112). The processor 712 of the illustrated example is in communication with a main memory including a volatile memory 714 and a non-volatile memory 716 via a bus 718. The volatile memory 714 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 716 may be implemented by flash memory and/or any other desired type of memory device. Access to the main memory 714, 716 is controlled by a memory controller.

The processor platform 700 of the illustrated example also includes an interface circuit 720. The interface circuit 720 may be implemented by any type of interface standard, such as an Ethernet interface, a universal serial bus (USB), a Bluetooth® interface, a near field communication (NFC) interface, and/or a PCI express interface.

In the illustrated example, one or more input devices 722 are connected to the interface circuit 720. The input device(s) 722 permit(s) a user to enter data and/or commands into the processor 712. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 724 are also connected to the interface circuit 720 of the illustrated example. The output devices 724 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 720 of the illustrated example, thus, typically includes a graphics driver card, a graphics driver chip and/or a graphics driver processor.

The interface circuit 720 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 726. The communication can be via, for example, an Ethernet connection, a digital subscriber line (DSL) connection, a telephone line connection, a coaxial cable system, a satellite system, a line-of-site wireless system, a cellular telephone system, etc.

The processor platform 700 of the illustrated example also includes one or more mass storage devices 728 for storing software and/or data. Examples of such mass storage devices 728 include floppy disk drives, hard drive disks, compact disk drives, Blu-ray disk drives, redundant array of independent disks (RAID) systems, and digital versatile disk (DVD) drives.

The machine executable instructions 732 of FIGS. 4 and/or 4A may be stored in the mass storage device 728, in the volatile memory 714, in the non-volatile memory 716, and/or on a removable non-transitory computer readable storage medium such as a CD or DVD.

Figure 8:
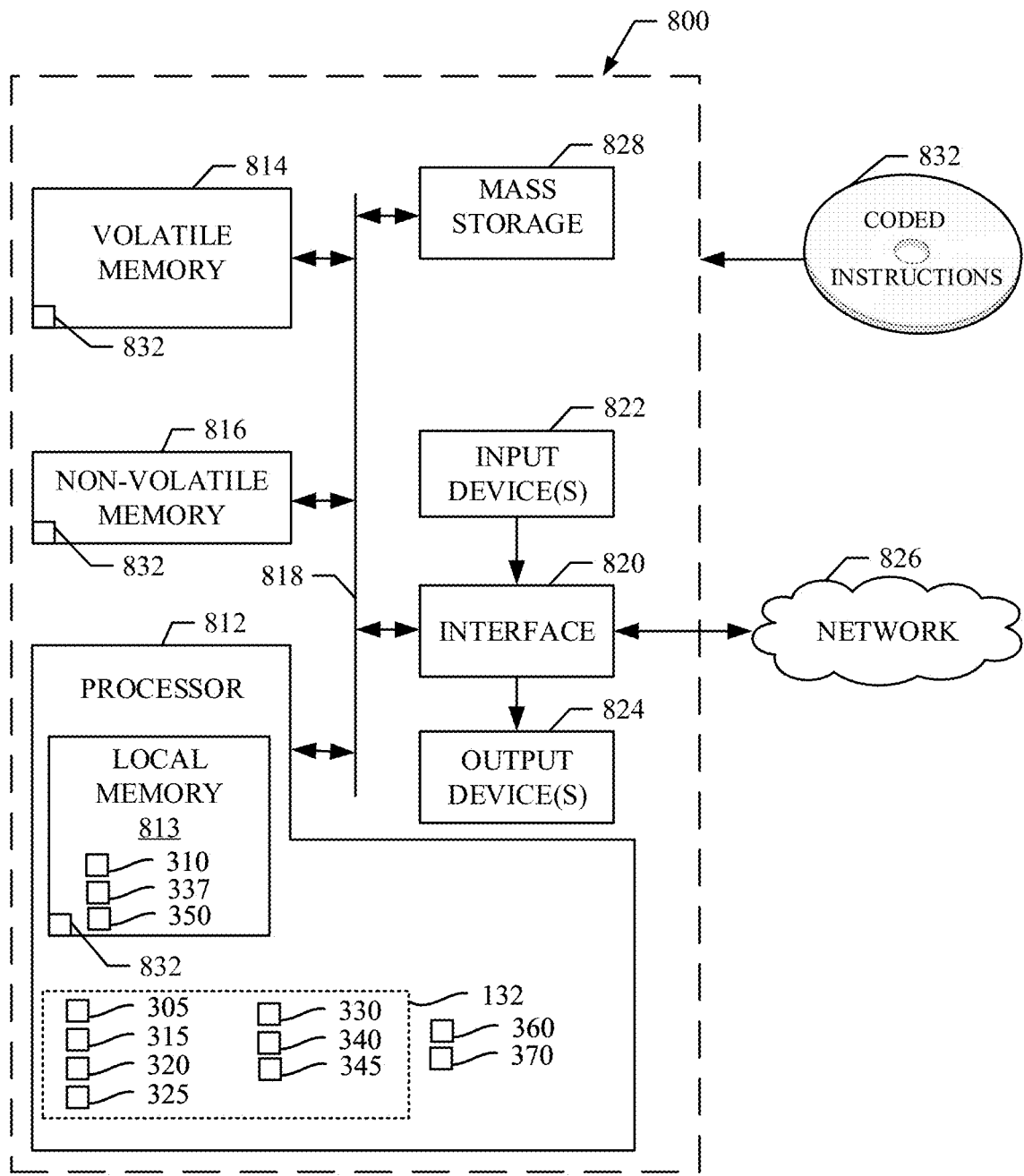
FIG. 8 is a block diagram of an example processing platform structured to execute the instructions of FIGS. 4, 5, and/or 6 to implement the example edge device of FIGS. 1 and/or 3.

FIG. 8 is a block diagram of an example processor platform 800 structured to execute the instructions of FIGS. 4, 5A, 5B, and/or 6 to implement the example edge device 130 of FIGS. 1 and/or 3. The processor platform 800 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 800 of the illustrated example includes a processor 812. The processor 812 of the illustrated example is hardware. For example, the processor 812 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example model receiver 305, the example neural network processor 315, the example neural network trainer 320, the example local data throttler 325, the example model update provider 330, the example local data accesser 335, the example query handler 340, the example input scanner 345, the example trusted input hardware 360, and/or the example local data provider 370. In the illustrated example of FIG. 8, the example model receiver 305, the example neural network processor 315, the example neural network trainer 320, the example local data throttler 325, the example model update provider 330, the example local data accesser 335, the example query handler 340, and the example input scanner 345 are implemented within the trusted execution environment 132.

The processor 812 of the illustrated example includes a local memory 813 (e.g., a cache). The local memory 813 implements the local model data store 310, the example hash ledger 337, and the example query ledger 350 (which may be implemented as a part of the trusted execution environment 132). The processor 812 of the illustrated example is in communication with a main memory including a volatile memory 814 and a non-volatile memory 816 via a bus 818. The volatile memory 814 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 816 may be implemented by flash memory and/or any other desired type of memory device. Access to the main memory 814, 816 is controlled by a memory controller.

The processor platform 800 of the illustrated example also includes an interface circuit 820. The interface circuit 820 may be implemented by any type of interface standard, such as an Ethernet interface, a universal serial bus (USB), a Bluetooth® interface, a near field communication (NFC) interface, and/or a PCI express interface.

In the illustrated example, one or more input devices 822 are connected to the interface circuit 820. The input device(s) 822 permit(s) a user to enter data and/or commands into the processor 812. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 824 are also connected to the interface circuit 820 of the illustrated example. The output devices 824 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 820 of the illustrated example, thus, typically includes a graphics driver card, a graphics driver chip and/or a graphics driver processor.

The interface circuit 820 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 826. The communication can be via, for example, an Ethernet connection, a digital subscriber line (DSL) connection, a telephone line connection, a coaxial cable system, a satellite system, a line-of-site wireless system, a cellular telephone system, etc.

The processor platform 800 of the illustrated example also includes one or more mass storage devices 828 for storing software and/or data. Examples of such mass storage devices 828 include floppy disk drives, hard drive disks, compact disk drives, Blu-ray disk drives, redundant array of independent disks (RAID) systems, and digital versatile disk (DVD) drives.

The machine executable instructions 832 of FIGS. 4, 5A, 5B, and/or 6 may be stored in the mass storage device 828, in the volatile memory 814, in the non-volatile memory 816, and/or on a removable non-transitory computer readable storage medium such as a CD or DVD.

From the foregoing, it will be appreciated that example methods, apparatus and articles of manufacture have been disclosed that enable distributed training of a neural network that is robust against potential attack vectors that may attempt to damage and/or discover the neural network model.

Example 1 includes an edge device for federated training of a neural network, the edge device comprising a local data throttler to determine whether to allow a new local data item to be incorporated into a training process of a neural network at the edge device, the neural network implemented within a trusted execution environment of the edge device, a hash ledger to store hashes corresponding to local data items that are permitted to be used in training of the neural network a model receiver to apply model parameters provided to the neural network by an aggregator device, a neural network trainer to train the neural network to create a model update using local data items that have a corresponding hash stored in the hash ledger, and a model update provider to provide the model update to the aggregator device.

Example 2 includes the edge device of example 1, wherein the local data throttler is further to determine whether the new local data item is trusted.

Example 3 includes the edge device of example 2, wherein the local data throttler is to determine that the new local data item is trusted when the new local data item originates from trusted hardware.

Example 4 includes the edge device of any one of examples 1 through 3, further including a local data accesser to validate hashes of the local data items against previously stored hashes of the respective local data items stored in the hash ledger.

Example 5 includes the edge device of example 4, wherein the validating is to prevent use of the local data items that have been modified since their corresponding hash was stored in the hash ledger.

Example 6 includes the edge device of example 1, wherein the local data throttler is to commit the hashes stored in the hash ledger, and the neural network trainer is to train the neural network using the local data items that have a corresponding committed hash stored in the hash ledger.

Example 7 includes the edge device of example 1, wherein at least one of the local data throttler, the model receiver, the neural network trainer, and the model update provider are implemented within the trusted execution environment of the edge device.

Example 8 includes at least one tangible machine readable storage medium comprising instructions which, when executed, cause at least one processor of an edge device to at least determine whether to allow a new local data item to be incorporated into a training process of a neural network implemented at the edge device, the neural network implemented within a trusted execution environment, store, in response to determining that the new local data item is to be incorporated into the training process of the neural network, a hash of the new local data item in a hash ledger, apply model parameters to the neural network, the model parameters received from an aggregator device, train the neural network to create a model update using local data items, the local data items having hashes stored in the hash ledger, and provide the model update to the aggregator device.

Example 9 includes the at least one machine-readable storage medium of example 8, wherein the instructions, when executed, cause the at least one processor to commit the hash stored in the hash ledger, and train the neural network using local data items having committed hashes stored in the hash ledger.

Example 10 includes the at least one machine-readable storage medium of example 9, wherein the committing of the hash stored in the hash ledger is responsive to an instruction provided to the edge device by the aggregator device.

Example 11 includes the at least one machine-readable storage medium of any one of examples 8 through 10, wherein the instructions, when executed, cause the at least one processor to validate hashes of the local data items against previously stored hashes of the respective local data items stored in the hash ledger.

Example 12 includes the at least one machine-readable storage medium of example 11, wherein the validating is to prevent use of the local data items that have been modified since their corresponding hash was stored in the hash ledger.

Example 13 includes the at least one machine-readable storage medium of example 8, wherein the instructions, when executed, cause the at least one processor to determining whether the new training data originates from trusted input hardware.

Example 14 includes a method for federated training of a neural network, the method comprising determining, by executing an instruction with a processor of an edge device, whether to allow a new local data item to be incorporated into a training process of a neural network implemented at the edge device, the neural network implemented within a trusted execution environment, storing, in response to determining that the new local data item is to be incorporated into the training process of the neural network, a hash of the new local data item in a hash ledger, applying model parameters to the neural network, the model parameters received from an aggregator device, training the neural network to create a model update using local data items, the local data items having hashes stored in the hash ledger, and providing the model update to the aggregator device.

Example 15 includes the method of example 14, further including committing the hash stored in the hash ledger, wherein the training of the neural network is performed using the local data items having committed hashes stored in the hash ledger.

Example 16 includes the method of example 15, wherein the committing of the hash stored in the hash ledger is responsive to an instruction provided to the edge device by the aggregator device.

Example 17 includes the method of any one of examples 14 through 17, further including validating hashes of the local data items against previously stored hashes of the respective local data items stored in the hash ledger.

Example 18 includes the method of example 17, the validating to prevent use of the local data items that have been modified since their corresponding hash was stored in the hash ledger.

Example 19 includes the method of example 14, wherein the determining of whether to allow the new training data includes determining whether the new training data originates from trusted input hardware.

Example 20 includes a system for federated training of a neural network, the system comprising an aggregator device to aggregate model updates provided by one or more edge devices, and the one or more edge devices to implement respective neural networks, the one or more edge devices to provide the model updates to the aggregator device, at least one of the edge devices to implement the neural network within a trusted execution environment.

Example 21 includes the system of example 20, wherein the one or more edge devices are to throttle inclusion of new local training data when training the respective neural networks based on an instruction provided by the aggregator device.

Example 22 includes the system of example 20, wherein at least one of the one or more edge devices is to throttle a request for utilization of the respective neural network when the request does not originate from trusted hardware of the corresponding edge device.

Example 23 includes an edge device comprising a neural network processor to implement a neural network, a query handler to determine whether a source of a received query is trusted, the query requesting processing of local data using the neural network, the query handler to, in response to determining that source of the query is trusted, cause the neural network processor to process the local data using the neural network.

Example 24 includes the edge device of example 23, further including a query ledger to store a record identifying when a prior query was processed, the query handler to, when (1) the source of the query is not trusted, and (2) a threshold amount of time has elapsed since processing of the prior query, cause the neural network processor to process the local data using the neural network.

Example 25 includes the edge device of example 23, further including an input scanner to determine whether input data included in the query appears to be synthetic, the query handler to, when (1) the source of the query is not trusted, and (2) the input data is not synthetic, cause the neural network processor to process the local data using the neural network.

Example 26 includes the edge device of example 25, wherein the input scanner is to determine whether the input data included in the query appears to be synthetic based on an amount of similarity between the input data included in the query and training data used to train the neural network.

Example 27 includes the edge device of example 23, wherein the query handler is further to cause the neural network processor to process the local data using the neural network when (1) the source of the query is not trusted, and (2) an amount of information leakage that would be caused by processing of the query is below an information leakage threshold, processing the local data using the neural network to prepare the result.

Example 28 includes at least one machine readable storage medium comprising instructions which, when executed, cause at least one processor to at least access, at an edge device, a query requesting processing of local data using the neural network, determine whether a source of the query is trusted, in response to determining that source of the query is trusted, process the local data using the neural network to prepare a result, and provide the result to the source of the query.

Example 29 includes the at least one machine-readable storage medium of example 28, wherein the instructions, when executed, further cause the at least one processor to, in response to determining that the source of the query is not trusted determine whether a threshold amount of time has elapsed since processing of a prior query, in response to determining that the threshold amount of time has elapsed since processing of the prior query, process the local data using the neural network to prepare the result.

Example 30 includes the at least one machine-readable storage medium of example 28, wherein the instructions, when executed, further cause the at least one processor to, in response to determining that the source of the query is not trusted determine whether input data included in the query appears to be synthetic, and in response to determining that the input data included in the query does not appear to be synthetic, process the local data using the neural network to prepare the result.

Example 31 includes the at least one machine-readable storage medium of example 30, wherein the instructions, when executed, further cause the at least one processor to determine whether the input data included in the query appears to be synthetic based on amount of similarity between the input data included in the query and training data used to train the neural network.

Example 32 includes the at least one machine-readable storage medium of example 28, wherein the instructions, when executed, further cause the at least one processor to, in response to determining that the source of the query is not trusted determine whether an amount of information leakage is below an information leakage threshold, and in response to determining that the amount of information leakage is below the information leakage threshold, process the local data using the neural network to prepare the result.

Example 33 includes the at least one machine-readable storage medium of example 28, wherein the instructions, when executed, further cause the at least one processor to, in response to determining that the source of the query is not trusted determine whether a threshold amount of time has elapsed since processing of a prior query, determine whether input data included in the query appears to be synthetic, determine whether an amount of information leakage is below an information leakage threshold, and in response to determining that (1) the threshold amount of time has elapsed since processing of the prior query, (2) the input data included in the query does not appear to be synthetic, and (3) the amount of information leakage is below the information leakage threshold, process the local data using the neural network to prepare the result.

Example 34 includes a method for use of a neural network, the method comprising accessing, at an edge device, a query requesting processing of local data using the neural network, determining whether a source of the query is trusted, in response to determining that source of the query is trusted, processing the local data using the neural network to prepare a result, and providing the result to the source of the query.

Example 35 includes the method of example 34, further including, in response to determining that the source of the query is not trusted determining, by executing an instruction with the processor, whether a threshold amount of time has elapsed since processing of a prior query, in response to determining that the threshold amount of time has elapsed since processing of the prior query, processing the local data using the neural network to prepare the result.

Example 36 includes the method of example 34, further including, in response to determining that the source of the query is not trusted determining, by executing an instruction with the processor, whether input data included in the query appears to be synthetic, and in response to determining that the input data included in the query does not appear to be synthetic, processing the local data using the neural network to prepare the result.

Example 37 includes the method of example 36, wherein the determining of whether the input data included in the query appears to be synthetic includes determining an amount of similarity between the input data included in the query and training data used to train the neural network.

Example 38 includes the method of example 34, further including, in response to determining that the source of the query is not trusted determining, by executing an instruction with a processor, whether an amount of information leakage is below an information leakage threshold, and in response to determining that the amount of information leakage is below the information leakage threshold, processing the local data using the neural network to prepare the result.

Example 39 includes the method of example 34, further including, in response to determining that the source of the query is not trusted determining, by executing an instruction with the processor, whether a threshold amount of time has elapsed since processing of a prior query, determining, by executing an instruction with the processor, whether input data included in the query appears to be synthetic, determining, by executing an instruction with a processor, whether an amount of information leakage is below an information leakage threshold, and in response to determining that (1) the threshold amount of time has elapsed since processing of the prior query, (2) the input data included in the query does not appear to be synthetic, and (3) the amount of information leakage is below the information leakage threshold, processing the local data using the neural network to prepare the result.

Example 40 includes a system for federated training of a neural network, the system comprising an aggregator device to aggregate model updates provided by one or more edge devices, the aggregator device to instruct the one or more edge devices to not use new local training data when training a machine learning model, and the one or more edge devices to implement respective neural networks, the one or more edge devices to provide the model updates to the aggregator device, the model updates created based on the new local training data received since the prior training round.

Example 41 includes the system of example 40, wherein the aggregator device is to instruct the one or more edge devices to use the new local training data for a given training round.

Example 42 includes the system of example 40, wherein the aggregator device is to implement a trusted execution environment.

Example 43 includes an edge device for federated training of a neural network, the edge device comprising throttling means for determining whether to allow a new local data item to be incorporated into a training process of a neural network the edge device, the neural network implemented within a trusted execution environment of the edge device, means for storing to store hashes corresponding to local data items that are permitted to be used in training of the neural network means for applying model parameters provided to the neural network by an aggregator device, means for training the neural network to create a model update using local data items that have a corresponding hash stored in the hash ledger, and means for providing the model update to the aggregator device.

Example 44 includes the edge device of example 43, wherein the throttling means is further to determine whether the new local data item is trusted.

Example 45 includes the edge device of example 44, wherein the throttling means is to determine that the new local data item is trusted when the new local data item originates from trusted hardware.

Example 46 includes the edge device of example 43, further including means for validating hashes of the local data items against previously stored hashes of the respective local data items stored in the hash ledger.

Example 47 includes the edge device of example 4, wherein the validating is to prevent use of the local data items that have been modified since their corresponding hash was stored in the hash ledger.

Example 48 includes the edge device of example 43, wherein the throttling means is to commit the hashes stored in the hash ledger, and the training means is to train the neural network using the local data items that have a corresponding committed hash stored in the hash ledger.

Example 49 includes the edge device of example 43, wherein at least one of the throttling means, the means for storing, the means for applying, the means for training, and the means for providing are implemented within the trusted execution environment of the edge device.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An edge device for federated training of a neural network, the edge device comprising:
    a local data throttler to determine whether to allow a new local data item to be incorporated into a training process of a neural network at the edge device based on the local data throttler determining whether a number of training rounds elapsed since local data was allowed to be incorporated into the training process of the neural network at the edge device satisfies a threshold number of elapsed training rounds, the threshold number of elapsed training rounds determined based on an instruction received at the edge device from an aggregator device, the neural network implemented within a trusted execution environment of the edge device;
    a hash ledger to store hashes corresponding to local data items that are permitted to be used in training of the neural network;
    a model receiver to apply model parameters provided to the neural network by the aggregator device;
    a neural network trainer to train the neural network to create a model update using local data items that have a corresponding hash stored in the hash ledger; and
    a model update provider to provide the model update to the aggregator device.

2. The edge device of claim 1, wherein the local data throttler is further to determine whether the new local data item is trusted.

3. The edge device of claim 2, wherein the local data throttler is to determine that the new local data item is trusted when the new local data item originates from trusted hardware.

4. The edge device of claim 1, further including a local data accesser to validate hashes of the local data items against previously stored hashes of the respective local data items stored in the hash ledger.

5. The edge device of claim 4, wherein the validating is to prevent use of the local data items that have been modified since their corresponding hash was stored in the hash ledger.

6. The edge device of claim 1, wherein the local data throttler is to commit the hashes stored in the hash ledger in response to determining that the number of training rounds elapsed since the local data was allowed to be incorporated into the training process of the neural network at the edge device satisfies the threshold number of elapsed training rounds, and the neural network trainer is to train the neural network using the local data items that have a corresponding committed hash stored in the hash ledger.

7. The edge device of claim 1, wherein at least one of the local data throttler, the model receiver, the neural network trainer, and the model update provider are implemented within the trusted execution environment of the edge device.

8. At least one tangible machine readable storage medium comprising instructions which, when executed, cause at least one processor of an edge device to at least:
    determine whether to allow a new local data item to be incorporated into a training process of a neural network implemented at the edge device based on the at least one processor determining whether a number of training rounds elapsed since local data was allowed to be incorporated into the training process of the neural network at the edge device satisfies a threshold number of elapsed training rounds, the threshold number of elapsed training rounds determined based on an instruction received at the edge device from an aggregator device, the neural network implemented within a trusted execution environment;
    store, in response to the determination that the new local data item is to be incorporated into the training process of the neural network, a hash of the new local data item in a hash ledger;
    apply model parameters to the neural network, the model parameters received from the aggregator device;
    train the neural network to create a model update using local data items, the local data items having hashes stored in the hash ledger; and
    provide the model update to the aggregator device.

9. The at least one machine-readable storage medium of claim 8, wherein the instructions, when executed, cause the at least one processor to:
    commit the hash stored in the hash ledger in response to the determination that the number of training rounds elapsed since the local data was allowed to be incorporated into the training process of the neural network at the edge device satisfies the threshold number of elapsed training rounds; and
    train the neural network using local data items having committed hashes stored in the hash ledger.

10. The at least one machine-readable storage medium of claim 9, wherein the committing of the hash stored in the hash ledger is responsive to an instruction provided to the edge device by the aggregator device.

11. The at least one machine-readable storage medium of claim 8, wherein the instructions, when executed, cause the at least one processor to validate hashes of the local data items against previously stored hashes of the respective local data items stored in the hash ledger.

12. The at least one machine-readable storage medium of claim 11, wherein the validating is to prevent use of the local data items that have been modified since their corresponding hash was stored in the hash ledger.

13. The at least one machine-readable storage medium of claim 8, wherein the instructions, when executed, cause the at least one processor to determine whether the new training data originates from trusted input hardware.

14. A method for federated training of a neural network, the method comprising:
    determining, by executing an instruction with a processor of an edge device, whether to allow a new local data item to be incorporated into a training process of a neural network implemented at the edge device based on the processor of the edge device determining whether a number of training rounds elapsed since local data was allowed to be incorporated into the training process of the neural network at the edge device satisfies a threshold number of elapsed training rounds, the threshold number of elapsed training rounds determined based on an instruction received at the edge device from an aggregator device, the neural network implemented within a trusted execution environment;

storing, in response to determining that the new local data item is to be incorporated into the training process of the neural network, a hash of the new local data item in a hash ledger;

applying model parameters to the neural network, the model parameters received from the aggregator device;

training the neural network to create a model update using local data items, the local data items having hashes stored in the hash ledger; and providing the model update to the aggregator device.

15. The method of claim 14, further including committing the hash stored in the hash ledger in response to determining that the number of training rounds elapsed since the local data was allowed to be incorporated into the training process of the neural network at the edge device satisfies the threshold number of elapsed training rounds, wherein the training of the neural network is performed using the local data items having committed hashes stored in the hash ledger.

16. The method of claim 15, wherein the committing of the hash stored in the hash ledger is responsive to an instruction provided to the edge device by the aggregator device.

17. The method of claim 14, further including validating hashes of the local data items against previously stored hashes of the respective local data items stored in the hash ledger.

18. The method of claim 17, wherein the validating prevents use of the local data items that have been modified since their corresponding hash was stored in the hash ledger.

19. The method of claim 14, wherein the determining of whether to allow the new training data includes determining whether the new training data originates from trusted input hardware.

20. An edge device for federated training of a neural network, the edge device comprising:
    memory;
    instructions in the edge device; and
    at least one processor to execute the instructions to at least:
        determine whether to allow a new local data item to be incorporated into a training process of a neural network implemented at the edge device based on whether a number of training rounds elapsed since local data was allowed to be incorporated into the training process of the neural network at the edge device satisfies a threshold number of elapsed training rounds, the threshold number of elapsed training rounds determined based on an instruction received at the edge device from an aggregator device, the neural network implemented within a trusted execution environment;
        store, in response to the determination that the new local data item is to be incorporated into the training process of the neural network, a hash of the new local data item in a hash ledger;
        apply model parameters to the neural network, the model parameters received from the aggregator device;
        train the neural network to create a model update using local data items, the local data items having hashes stored in the hash ledger; and
        provide the model update to the aggregator device.

21. The edge device of claim 20, wherein the at least one processor is to execute the instructions to:
    commit the hash stored in the hash ledger in response to the determination that the number of training rounds elapsed since the local data was allowed to be incorporated into the training process of the neural network at the edge device satisfies the threshold number of elapsed training rounds; and
    train the neural network using local data items having committed hashes stored in the hash ledger.

22. The edge device of claim 20, wherein the at least one processor is to execute the instructions to validate hashes of the local data items against previously stored hashes of the respective local data items stored in the hash ledger, the validating to prevent use of the local data items that have been modified since their corresponding hash was stored in the hash ledger.

23. The edge device of claim 20, wherein the at least one processor is to execute the instructions to determine whether the new training data originates from trusted input hardware.

* * * * *